United States Patent [19]

Marti Sala

[11] Patent Number: 5,197,586
[45] Date of Patent: Mar. 30, 1993

[54] AUTOMATIC MACHINE FOR UPRIGHTLY POSITIONING AND FEEDING CONTAINERS

[76] Inventor: Jaime Marti Sala, c/Emancipación, 8, 08017 Barcelona, Spain

[21] Appl. No.: 742,765

[22] Filed: Aug. 9, 1991

[30] Foreign Application Priority Data

Aug. 10, 1990 [FR] France .................................. 90 10491

[51] Int. Cl.$^5$ ............................................. B65G 47/31
[52] U.S. Cl. ..................................... 198/462; 198/633
[58] Field of Search ................... 198/419.3, 462, 836.3, 198/836.1, 633, 461

[56] References Cited

U.S. PATENT DOCUMENTS

| | | | |
|---|---|---|---|
| 2,599,221 | 6/1952 | Bergmann | 198/462 X |
| 3,295,659 | 1/1967 | Aidlin . | |
| 3,457,692 | 7/1969 | Gerlach | 198/462 X |
| 3,565,235 | 2/1971 | Brown et al. | 198/462 |
| 3,908,332 | 9/1975 | Ebbinghaus et al. | 198/419.3 X |
| 3,978,971 | 9/1976 | Conrow et al. | 198/462 |
| 4,093,063 | 6/1978 | Calvert et al. | 198/419.3 |
| 4,164,996 | 8/1979 | Tomlinson | 198/462 X |
| 4,681,209 | 7/1987 | Marti Sala . | |
| 4,709,800 | 12/1987 | Olsen | 198/462 X |
| 4,796,746 | 1/1989 | Bergstrom et al. | 198/633 X |
| 4,934,510 | 6/1990 | Lutgendorf | 198/461 |
| 5,082,104 | 1/1992 | Marceau | 198/419.3 |

FOREIGN PATENT DOCUMENTS

| | | | |
|---|---|---|---|
| 2593478 | 11/1987 | France . | |
| 1014767 | 12/1965 | United Kingdom | 198/462 |
| 1386771 | 3/1975 | United Kingdom . | |

*Primary Examiner*—D. Glenn Dayoan
*Attorney, Agent, or Firm*—Jacobson, Price, Holman & Stern

[57] ABSTRACT

An apparatus for use with a continuous belt type conveyor transporting containers from the exit portion of an automatic machine for uprightly positioning and feeding containers, includes at least one first braking unit (1, 11) each having an endless belt (6) running over two spaced cylinders (7), flexible paddles (8) mounted on the belt (6) so that they extend outwardly therefrom over the area above the conveyor belt 3 and are engageable with the containers (2) as they are transported by the conveyor and a drive motor (34) for driving one of the cylinders (7) at a speed predetermined to control the linear speed of the paddles slower than the linear speed of the conveyor belt (3) to thereby move the containers relatively on the conveyor belt closer together downstream of the exit portion of the machine. A second braking unit (5) is provided downstream of the first braking unit and has a frame member (19) rotatably mounted on a vertical axis (14), fingers (12) mounted on the frame member (19) and extending donwstream of the conveyor for sliding engagement with the containers as they move along the conveyor, and a spring (16) for resiliently urging the frame member (19) rotatably for resiliently urging the fingers (12) into resilient engagement with the containers so that the containers are retarded or slowed in their linear speed along the conveyor (3) into contacting engagement with each other.

21 Claims, 3 Drawing Sheets

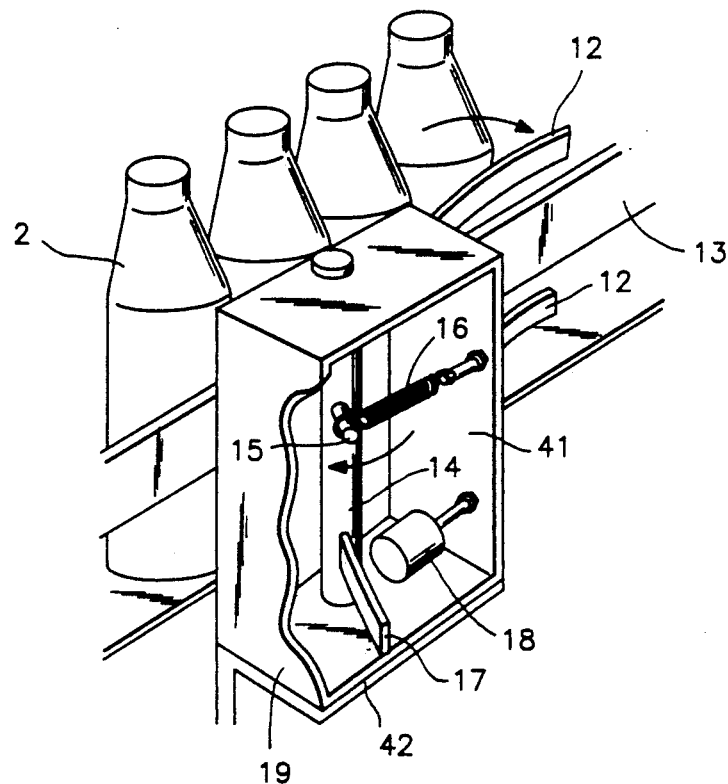
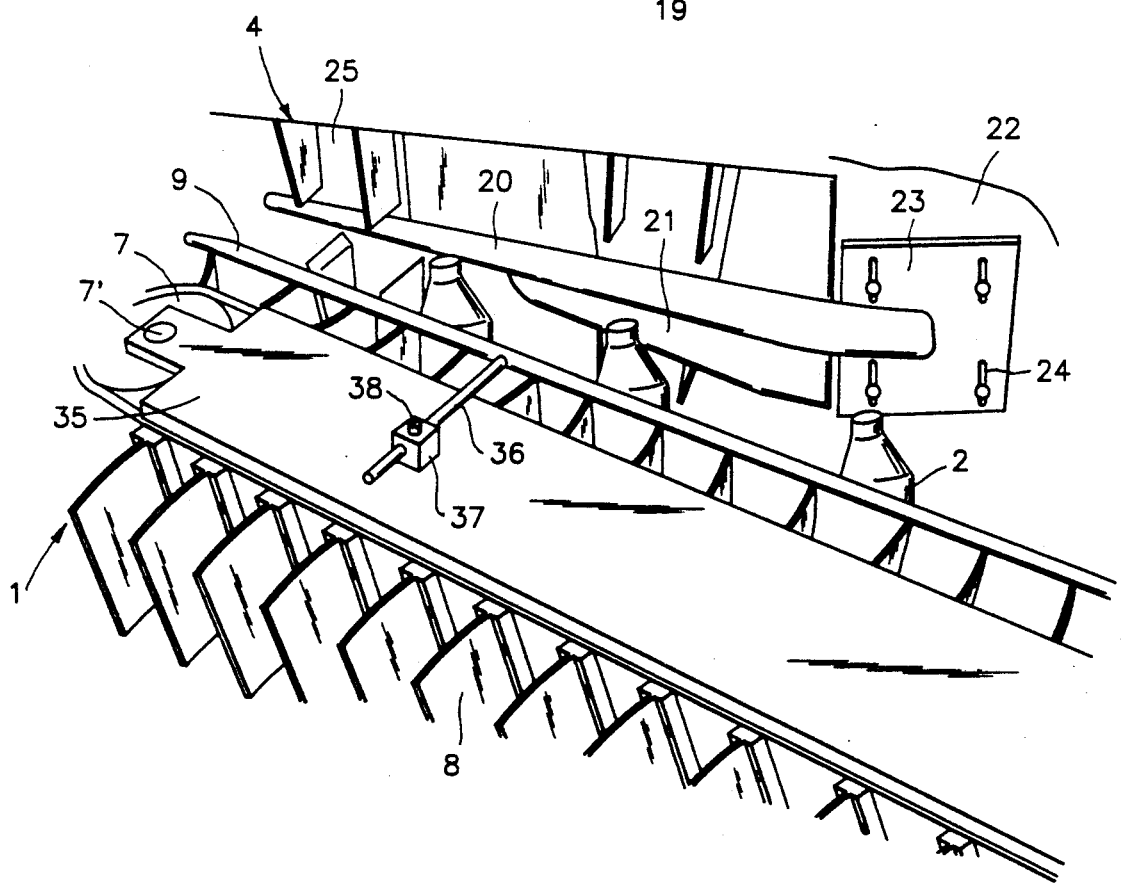

AUTOMATIC MACHINE FOR UPRIGHTLY POSITIONING AND FEEDING CONTAINERS

BACKGROUND OF THE INVENTION

The invention relates to improvements in an automatic machine for uprightly positioning and continuously feeding containers, of any shape and size, in particular lightweight articles, such as empty plastic bottles. This machine is designed for continuous feeding of other machines such as high production filling machines or similar equipment.

Known machines of the type to which the present invention relates may include in general:

a) a hopper of any shape or dimension to receive in bulk containers that fall onto a bottom plane whose edges are at a distance from the side wall of the hopper providing a space allowing the passage of the containers;

b) a structure, provided with displacement means in an enclosed circuit, located below the bottom plane, including, fully or in part:

a plurality of pockets at the periphery of the structure, adapted to receive containers in a lying position and provided with retaining means for one part of the containers, namely their neck, in such a way as to release them in a predetermined position, usually with the neck upward;

a plurality of discharge chutes provided under the pockets for receiving and transferring the containers, correctly oriented, towards an exit conveyor that feeds, for example, a bottling line;

c) a plane or shelf, located below the pockets and over the chutes, designed to support the containers when they are conveyed by the pockets, the plane or shelf being provided with an opening in an unloading area through which the containers drop when moved into position thereover by the container holding elements;

d) a linear moving conveyor, provided with lateral supporting bars, which moves underneath the chute section along a path generally tangent to the path of movement of the chutes an the containers therein, to receive the containers from the chutes and transport them in alignment away from the machine; and e) means to assist in gently transferring the containers from the lower section of the chutes onto the linear moving conveyor;

There are many forces tending to unbalance the bottle during the bottle's transfer from the displaceable chutes to the belt of the moving conveyor. The plastic bottles leave the circular or enclosed circuit motion thereof with the drum of chutes and their motion is changed to a generally linear motion with the moving conveyor. The inertia force due to movement with the chute in an enclosed circuit tends to tip the bottle over outwardly from the drum. There is also an inertia force tending to tip the bottle forward. All these forces are of particular importance mainly because of the distance between the bottles imposed by the separation of the discharge chutes. In addition, in bottle of petiolate type (PET bottles) with a small supporting bottom the conditions of transport are still more difficult.

Machines known to the applicant of the type referred are described in the following U.S. Pat. Nos. 3,295,659; 3,650,368; 4,130,194; 4,865,181; 4,681,209 and 4,928,808.

Among the known means to convey containers when they exit the positioning machine, there exist:

an endless belt provided having holes connected to a pneumatic suction chamber which function to retain the containers steady on the belt, supported by their bottom; this does not cause the containers to approach each other, but holds them at a distance approximately equivalent to their spacing in the discharge chutes, so that the above-mentioned forces tending to tip the bottles during their motion create frequent disruptions;

a rotating star-shaped element that functions to take each container removed from the discharge chute of the machine to transfer it onto the moving conveyor belt; this requires a perfect synchronization between the displacing speed of the chutes and the star-shaped element displacement speed, so that in case of an incorrect synchronization or positioning of the containers, they are crushed.

BRIEF SUMMARY OF THE INVENTION

In order to solve the above problems this invention was conceived to essentially provide means associated with a first portion of linear moving conveyor belt at the exit of the positioning machine which mainly causes the bottles to approach each other and to continue their motion on the conveyor with their bodies placed close together and therefore in a secure and steady condition.

It is an object of this invention to improve upon prior exit moving conveyors associated with container or bottle unscrambling and positioning machines of the type referred to above by overcoming the above mentioned disadvantages.

The above objectives are achieved in accordance with the present invention by effectively moving the containers removed from the unscrambling machines close together so that they are transported by the moving conveyor in alignment and in contact side by side.

The invention comprises:

at least one first means for braking and dragging containers, having a translation movement located on the run of the containers, along a first portion of the moving conveyor belt immediate to the container exit of the positioning machine, which action decreases the output and forward speed on the moving belt of said containers to effect a relative movement of the containers toward each other, the first means cooperating in addition to maintain the containers in an upright position and ejecting out of the conveyor any containers that are accidentally turned down or tipped over;

a second means for braking containers that operates transversely and laterally on the run of the containers on the moving conveyor belt, located downstream of the first means, thereby restraining the containers to effect further relative movement of the containers until they are closely adjacent side by side, and to allow their passage in this condition by a permanent interaction with the second braking means.

The above and other objects, advantages and features of the present invention will become more apparent from the following description of certain preferred embodiments thereof.

BRIEF DESCRIPTION OF THE DRAWINGS

The invention will now be described in detail with reference to the accompanying drawings wherein:

FIG. 3, is an enlarged perspective view of referred second braking means; and

FIG. 4 is a fragmentary perspective view of a first portion of the linear moving conveyor proximate the container exit portion of the positioning machine.

DETAILED DESCRIPTION

Figure 1:
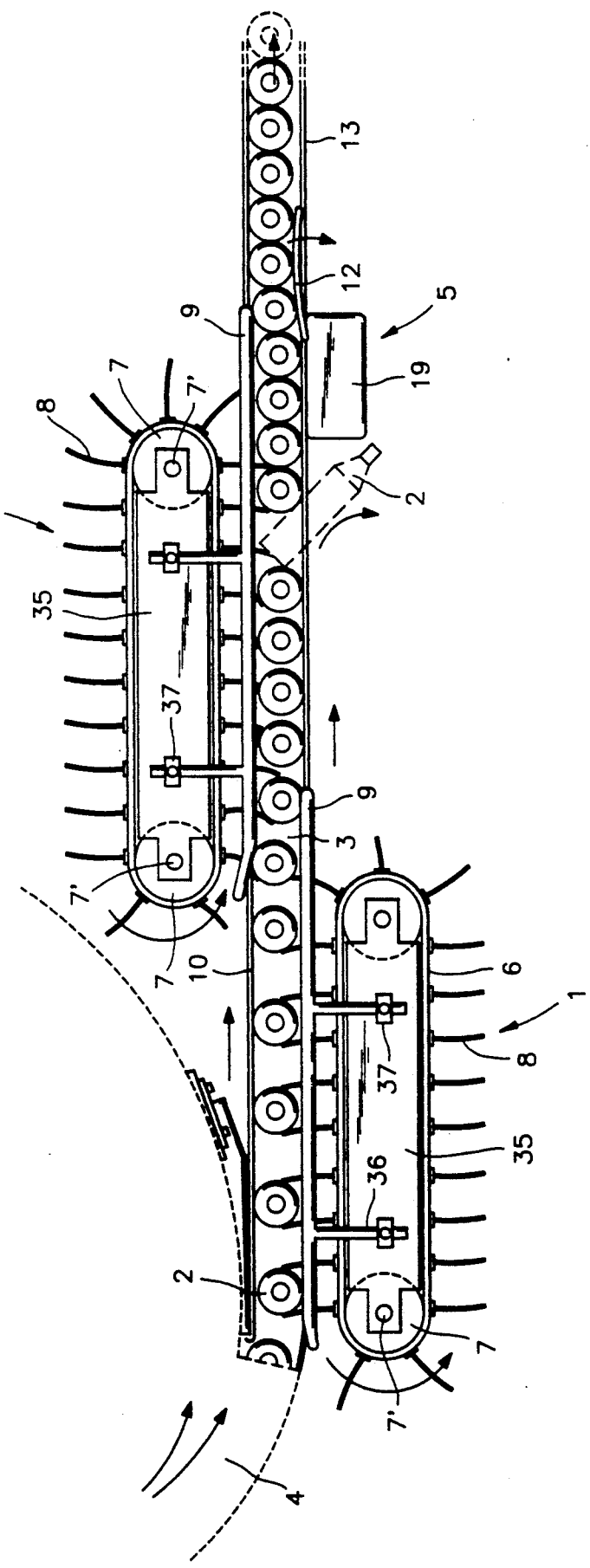
FIG. 1 is a top plan view of an embodiment of the invention comprised in an assembly adapted for use in association with an unscrambling machine.

The assembly shown on the figures has at least one first means 1 for braking and dragging containers 2 having a rectilinear translation movement located on the run of the containers, along a first portion of the linear moving conveyor belt 3, proximate the exit aperture of the machine 4, and whose action causes a decreasing of the output and forward speed on the belt of the containers to effect relative movement of the containers closer together. This device also cooperates in addition to maintain the containers in an upright position and eject out of the moving conveyor any that are accidentally turned down or tipped over.

A second means 5 for braking containers, located downstream of first means 1, operates transversely and laterally on the run of the containers along the moving conveyor belt 3 to effect further relative movement of the containers until they are in contact with each other and to allow their passage therethrough in this contacting condition, by a permanent interaction with the second braking means 5.

The first means 1 for braking and dragging containers is constituted by an endless belt 6 having a translation movement in the same direction as that of the moving conveyor belt 3 and mounted between two rotatable cylinders 7 mounted for rotation on axes 7' perpendicular to the plane of the moving conveyor 3, one of the cylinders being the drive cylinder and the other being driven. Each cylinder 7 and belt 6 assembly is installed laterally on one side of the moving conveyor 3 and the belt 6 thereof is provided with a plurality of flexible paddles 8 mounted thereon in a row aligned with the moving conveyor belt and passing below one of the side supporting bars 9. The side supporting bar 9 is located in the area of passage of the containers 2 and has a length to extend until approximately a medium area of the container run, and defines with opposite side supporting bar 10 a channel in such a way as to keep the containers in upright position. Supporting bar 10 can be mounted by brackets (not shown) on a side of the conveyor assembly for belt 3, as will later become more apparent. Conveyor belt 3 is part of a conveyor assembly shown generally at 30 having side walls 31 and rollers 32 over which belt 3 passes in a manner well known. Belt 3 is driven by a means (not shown) at a desired speed for transporting container 2 away from the container exit of machine 4. Each first braking means 1 has one cylinder 7 driven by a motor 33 through a gear arrangement or transmission 34 in a well known manner such as by connecting the output shaft of the transmission to the central axle shaft of one cylinder 7 located on axis 7'. The ends of each axle shaft are mounted in upper and lower support plates 35 which are otherwise held together and reinforced by suitable means such as cross bars (not shown).

The speed of motor 33 and/or belt 6 is controlled in a suitable manner by a well known means (not shown) so that its linear speed along conveyor belt 3 is less than the speed of belt 3 an amount sufficient to produce the braking and moving together of containers 2 by paddles 8 as the containers move with conveyor belt 3.

A third braking means 11, similar to the former first means 1, can be associated with the conveyor assembly on the opposite side thereof for positioning machines operating at a high speed.

These two first braking means 1 and 11 are then composed of two braking assemblies having endless belts provided with flexible paddles 8, operating at different speeds, located on both sides of the moving conveyor belt, in an area adjacent to the positioning machine, and arranged in such a way that the paddles cover two consecutive sectors of the moving conveyor belt. Braking assembly 11 operates at a lower speed than 1 so that together they gradually move the containers together as shown in FIG. 1.

Figure 2:
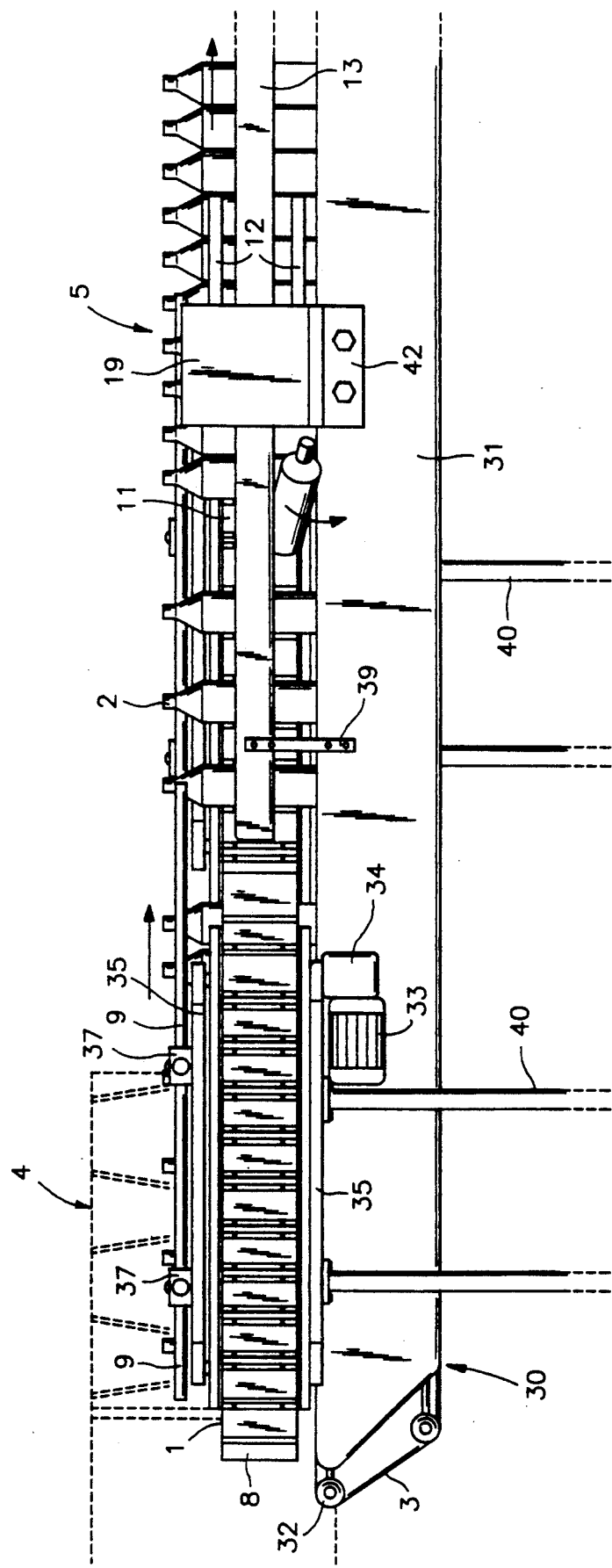
FIG. 2, is a side elevational view of the assembly of FIG. 1.

The second means 5 for braking containers, that operates transversely and laterally on the run of the containers, is constituted by rod type elements 12 that are interposed on a lateral side of the moving conveyor belt 3, in front of the containers. Rods 12 extend above and below one of the side supporting bars 13 inwardly of the container run, over the moving conveyor belt. Rods 12 are assembled for swivelling around a shaft 14 provided with a protruding appendage 15 associated with an elastic means 16, such as a spring between appendage 15 and a wall 41 of frame 19 on which rods 12 are mounted. Frame 19 is rotatably mounted on shaft 14 which in turn is mounted on bracket 42 mounted on side wall 31. Elastic means 16 is adjustable in intensity, so that it tends to move rods 12 until in a position in front of the container run, causing their braking until the juxtaposition of container 2 occurs and allowing thereafter their passage along the channel delimited by lateral bars 9 and 10. Rotatable movement toward a side edge of the braking rods 12 cause the pressure of the row of containers as they advance along the moving conveyor to reach a particular value, whereby the bars 12 slide on the side surfaces of the containers 2. Shaft 14 also bears an appendage 17 to limit the rotation of the rods 12 by means of a stop 18 adjustably mounted on wall 41 of the frame 19 on which rods 12 are mounted. Bar 9 is supported in position by rods 36 adjustably mounted on blocks 37 attached in any suitable manner to top plate 35, such as by screw fasteners (not shown) or welding. Each rod 36 extends through a hole in block 37 and is fixed therein by set screw 38. Bars 10 and 13 may be supported by brackets 39 on the side walls 31 of the conveyor assembly, such as shown in FIG. 2, for example. Bracket 42 may also be supported by belts, for example, on side wall 31.

Each braking assembly 1 and 11 may be supported in the proper position on support members 40 as shown in FIG. 2.

The assembly further comprises profile 20 with an enlarged-panel-shaped extension 21, adjustable in height located on the side wall 22 of the machine 4 near the upper part of the container exit portion, oriented in such a way as to operate as a complementary guide deflecting the containers 2 in the direction of the moving conveyor belt 3 and cooperating to keep the containers 2 in an upright position during their critical transfer onto the moving conveyor belt 3. Side panel 21 avoids the containers tipping over in the area of the exit portion.

Profile 20 is connected to the positioning machine 4 housing by means of a plate 23 provided with adjusting slots 24 that allow its adjustment in height and locking at the desired position. The drum of the machine 4 bears a plurality of discharge chutes 25.

The means 1 located at the exit portion of the positioning machine, moves at a lower speed than the assembly of discharge chutes and also than the moving conveyor belt.

I claim:

1. In an automatic machine for uprightly positioning and feeding containers, such as lightweight plastic bottles, including a plurality of discharge chutes moving along an enclosed circuit in a path for uprightly positioning and feeding said containers, and an exit portion through which said containers pass, and a linear moving conveyor means adjacent to and associated with said exit portion and oriented along a path substantially aligned with the path of movement of the chutes and containers therein at said exit portion for receiving said containers thereon, the improvement comprising:

first braking means for braking and dragging containers on said conveyor means and having a linear translation movement located on the run of said containers along a first portion of said moving conveyor means proximate said positioning machine for decreasing the output and forward speed on the conveyor means of said containers so that said containers move relatively toward each other; and second braking means located downstream of said first braking means for braking containers and operating transversely and laterally on the run of said containers on said moving conveyor means to effect further relative movement of said containers into contacting relationship with each other and to allow passage of said contacting containers downstream of said second braking means.

2. The machine as claimed in claim 1 and further comprising:

cooperating means adjacent said conveyor means for maintaining said containers in an upright position on said conveyor means.

3. The machine as claimed in claim 2 wherein:

said cooperating means comprises at least one elongated supporting bar extending in adjacent spaced relation and substantially parallel to said conveyor belt so that said at least one supporting bar is engageable with said containers moving on said conveyor belt.

4. The machine as claimed in claim 2 wherein said second braking means comprises:

a frame member rotatably mounted on one side of said conveyor means on an axis of rotation lying in a plane extending substantially perpendicular to said plane of said conveyor belt;

at least one rod shaped finger mounted on said frame member and extending into the area over said conveyor belt for engagement with said containers moving on said conveyor belt; and resilient means for urging said frame member rotatably about said axis of rotation so that said at least one finger resiliently engages said containers in sliding relationship for slowing the linear speed of said container to move said containers relatively into contacting relationship during movement thereof on said conveyor means.

5. The machine as claimed in claim 3 wherein said second braking means comprises:

a frame member rotatably mounted on one side of said conveyor means on an axis of rotation lying in a plane extending substantially perpendicular to said plane of said conveyor belt;

at least one rod shaped finger mounted on said frame member and extending into the area over said conveyor belt for engagement with said containers moving on said conveyor belt; and resilient means for urging said frame member rotatably about said axis of rotation so that said at least one finger resiliently engages said containers in sliding relationship for slowing the linear speed of said container to move said containers relatively into contacting relationship during movement thereof on said conveyor means.

6. In an automatic machine for uprightly positioning and feeding containers, such as lightweight plastic bottles, including a plurality of discharge chutes moving along an enclosed circuit in a path for uprightly positioning and feeding said containers, and an exit portion through which said containers pass, and a linear moving conveyor means adjacent to and associated with said exit portion and oriented along a path substantially aligned with the path of movement of the chutes and containers therein at said exit portion for receiving said containers thereon, the improvement comprising:

first braking means for braking and dragging containers on said conveyor means and having a translation movement located on the run of said containers along a first portion of said moving conveyor means proximate said positioning machine for decreasing the output and forward speed on the conveyor means of said containers so that said containers move relatively toward each other; and second braking means located downstream of said first braking means for braking containers and operating transversely and laterally on the run of said containers on said moving conveyor means to effect further relative movement of said containers into contacting relationship with each other and to allow passage of said contacting containers downstream of said second braking means;

said conveyor means comprising an endless belt conveyor having upper and lower runs, said containers being supported and moved on said upper run of the belt thereof; and said first braking means being at least one braking unit on one side of said conveyor means and being at least one braking unit on one side of said conveyor means and comprising, two spaced cylinders mounted for rotation on axes lying in a plane extending substantially perpendicular and parallel to the plane of said conveyor belt, an endless braking belt mounted on said cylinders for being driven thereby, a plurality of flexible paddles mounted in relative spaced relation on said endless braking belt and extending at least partially over the area of the path of travel of said containers on said upper run of said endless belt conveyor for engaging said containers, and means for driving one of said cylinders rotatably at a predetermined speed so that said braking belt is driven at a linear speed slower than the linear speed of said conveyor belt.

7. The machine as claimed in claim 6 and further comprising:
cooperating means adjacent said conveyor means for maintaining said containers in an upright position on said conveyor means.

8. The machine as claimed in claim 7 wherein:
said cooperating means comprises at least one elongated supporting bar extending in adjacent spaced relation and substantially parallel to said conveyor belt so that said at least one supporting bar is engageable with said containers moving on said conveyor belt.

9. The machine as claimed in claim 6 wherein said at least one braking unit comprises a second braking unit on the other side of said conveyor downstream of said first recited braking unit and comprises:
two spaced second cylinders mounted for rotation on axes lying in a plane extending substantially perpendicular and parallel to the plane of said conveyor belt;
a second endless braking belt mounted on said second cylinders for being driven thereby;
a plurality of second flexible paddles mounted in relative spaced relation on said second endless braking belt and extending at least partially over the area of the path of travel of said containers on said upper run of said endless belt conveyor for engaging said containers; and
means for driving one of said second cylinders rotatably at a predetermined speed so that said second braking belt is driven at a linear speed slower than the linear speed of said braking belt of said first braking unit.

10. The machine as claimed in claim 7 wherein said at least one braking unit comprises a second braking unit on the other side of said conveyor downstream of said first recited braking unit and comprises:
two spaced second cylinders mounted for rotation on axes lying in a plane extending substantially perpendicular and parallel to the plane of said conveyor belt;
a second endless braking belt mounted on said second cylinders for being driven thereby;
a plurality of second flexible paddles mounted in relative spaced relation on said second endless braking belt and extending at least partially over the area of the path of travel of said containers on said upper run of said endless belt conveyor for engaging said containers; and
means for driving one of said second cylinders rotatably at a predetermined speed so that said second braking belt is driven at a linear speed slower than the linear speed of said braking belt of said first braking unit.

11. The machine as claimed in claim 8 wherein said at least one braking unit comprises a second braking unit on the other side of said conveyor downstream of said first recited braking unit and comprises:
two spaced second cylinders mounted for rotation on axes lying in a plane extending substantially perpendicular and parallel to the plane of said conveyor belt;
a second endless braking belt mounted on said second cylinders for being driven thereby;
a plurality of second flexible paddles mounted in relative spaced relation on said second endless braking belt and extending at least partially over the area of the path of travel of said containers on said upper run of said endless belt conveyor for engaging said containers; and
means for driving one of said second cylinders rotatably at a predetermined speed so that said second braking belt is driven at a linear speed slower than the linear speed of said braking belt of said first braking unit.

12. The machine as claimed in claim 6 wherein said second braking means comprises:
a frame member rotatably mounted on one side of said conveyor means on an axis of rotation lying in a plane extending substantially perpendicular to said plane of said conveyor belt;
at least one rod shaped finger mounted on said frame member and extending into the area over said conveyor belt for engagement with said containers moving on said conveyor belt; and
resilient means for urging said frame member rotatably about said axis of rotation so that said at least one finger resiliently engages said containers in sliding relationship for slowing the linear speed of said container to move said containers relatively into contacting relationship during movement thereof on said conveyor means.

13. The machine as claimed in claim 7 wherein said second braking means comprises:
a frame member rotatably mounted on one side of said conveyor means on an axis of rotation lying in a plane extending substantially perpendicular to said plane of said conveyor belt;
at least one rod shaped finger mounted on said frame member and extending into the area over said conveyor belt for engagement with said containers moving on said conveyor belt; and
resilient means for urging said frame member rotatably about said axis of rotation so that said at least one finger resiliently engages said containers in sliding relationship for slowing the linear speed of said container to move said containers relatively into contacting relationship during movement thereof on said conveyor means.

14. The machine as claimed in claim 9 wherein said second braking means comprises;
a frame member rotatably mounted on one side of said conveyor means on an axis of rotation lying in a plane extending substantially perpendicular to said plane of said conveyor belt;
at least one rod shaped finger mounted on said frame member and extending into the area over said conveyor belt for engagement with said containers moving on said conveyor belt; and
resilient means for urging said frame member rotatably about said axis of rotation so that said at least one finger resiliently engages said containers in sliding relationship for slowing the linear speed of said container to move said containers relatively into contacting relationship during movement thereof on said conveyor means.

15. The machine as claimed in claim 11 wherein said second braking means comprises:
a frame member rotatably mounted on one side of said conveyor means on an axis of rotation lying in a plane extending substantially perpendicular to said plane of said conveyor belt;
at least one rod shaped finger mounted on said frame member and extending into the area over said conveyor belt for engagement with said containers moving on said conveyor belt; and resilient means for urging said frame member rotatably about said axis of rotation so that said at least one finger resiliently engages said containers in sliding relationship for slowing the linear speed of said container to move said containers relatively into contacting relationship during movement thereof on said conveyor means.

16. The machine as claimed in claim 15 wherein:
said resilient means comprises an adjustable spring means.

17. The machine as claimed in claim 6 and further comprising:
guide means adjustably mounted on a side wall of the machine proximate said exit portion thereof for engaging and guiding said containers toward said conveyor means in an upright position.

18. The machine as claimed in claim 9 and further comprising:
cooperating means adjacent said conveyor means for maintaining said containers in an upright position on said conveyor means.

19. The machine as claimed in claim 18, wherein:
said cooperating means comprises at least one elongated supporting bar extending in adjacent spaced relation and substantially parallel to said conveyor belt so that said at least one supporting bar is engageable with said containers moving on said conveyor belt.

20. In an automatic machine for uprightly positioning and feeding containers, such as lightweight plastic bottles, including a plurality of discharge chutes moving along an enclosed circuit in a path for uprightly positioning and feeding said containers, and an exit portion through which said containers pass, and a linear moving conveyor means adjacent to and associated with said exit portion and oriented along a path substantially aligned with the path of movement of the chutes and containers therein at said exit portion for receiving said containers thereon, the improvement comprising:
first braking means for braking and dragging containers on said conveyor means and having a translation movement located on the run of said containers along a first portion of said moving conveyor means proximate said positioning machine for decreasing the output and forward speed on the conveyor means of said containers so that said containers move relatively toward each other; and
second braking means located downstream of said first braking means for braking containers and operating transversely and laterally on the run of said containers on said moving conveyor means to effect further relative movement of said containers into contacting relationship with each other and to allow passage of said contacting containers downstream of said second braking means, said second braking means comprising:
a frame member rotatably mounted on one side of said conveyor means on an axis of rotation lying in a plane extending substantially perpendicular to said plane of said conveyor belt,
at least one rod shaped finger mounted on said frame member and extending into the area over said conveyor belt for engagement with said containers moving on said conveyor belt, and
resilient means for urging said frame member rotatably about said axis of rotation so that said at least one finger resiliently engages said containers in sliding relationship for slowing the linear speed of said containers to move said containers relatively into contacting relationship during movement thereof on said conveyor means.

21. The machine as claimed in claim 20 wherein:
said resilient means comprises an adjustable spring means.

* * * * *